United States Patent
Cailleteau et al.

(10) Patent No.: US 8,931,847 B2
(45) Date of Patent: Jan. 13, 2015

(54) PASSENGER SEATING ASSEMBLIES AND ASPECTS THEREOF

(75) Inventors: Jeremy Cailleteau, Saint Aout (FR); David Da Silva, Bourges (FR)

(73) Assignee: Zodiac Seats France, Issoudun (FR)

( * ) Notice: Subject to any disclaimer, the term of this patent is extended or adjusted under 35 U.S.C. 154(b) by 368 days.

(21) Appl. No.: 13/066,003

(22) Filed: Apr. 4, 2011

(65) Prior Publication Data

US 2012/0091764 A1    Apr. 19, 2012

(30) Foreign Application Priority Data

| Oct. 18, 2010 | (EP) | .................................. 10306130 |
| Oct. 18, 2010 | (EP) | .................................. 10306131 |
| Oct. 18, 2010 | (EP) | .................................. 10306133 |
| Nov. 19, 2010 | (EP) | .................................. 10191891 |
| Nov. 22, 2010 | (EP) | .................................. 10192084 |

(51) Int. Cl.

| A47C 7/54  | (2006.01) |
| B60N 2/46  | (2006.01) |
| B64D 11/06 | (2006.01) |
| B60N 2/02  | (2006.01) |
| B60N 2/68  | (2006.01) |
| B60N 3/00  | (2006.01) |

(52) U.S. Cl.
CPC .............. B64D 11/06 (2013.01); B60N 2/0224 (2013.01); B60N 2/4613 (2013.01); B60N 2/682 (2013.01); B60N 2/686 (2013.01); B60N 3/004 (2013.01); B64D 2011/0606 (2013.01); B64D 2011/0613 (2013.01); B64D 2011/0679 (2013.01); B64D 2011/0662 (2013.01); B64D 2011/0648 (2013.01)

USPC ............. 297/411.32; 297/411.3; 297/411.35; 297/411.38

(58) Field of Classification Search
USPC ................ 297/411.3, 411.32, 411.35, 411.38
See application file for complete search history.

(56) References Cited

U.S. PATENT DOCUMENTS

| 3,583,760 | A |   | 6/1971 | McGregor |
| 4,526,421 | A |   | 7/1985 | Brennan et al. |
| 4,848,840 | A | * | 7/1989 | Toya .......................... 297/411.32 |
| 5,042,877 | A | * | 8/1991 | Yokota ..................... 297/411.32 |
| 5,752,739 | A | * | 5/1998 | Saeki ............................. 297/113 |

(Continued)

FOREIGN PATENT DOCUMENTS

| FR | 2817810        | 6/2002 |
| WO | 2004006069 A1  | 1/2004 |
| WO | 2012052823 A2  | 4/2012 |

OTHER PUBLICATIONS

Invitation to Pay Additional Fees and Communication Relating to the Results of the Partial International Search dated May 7, 2012 in Application No. PCT/IB2011/002491.

(Continued)

*Primary Examiner* — Philip Gabler
(74) *Attorney, Agent, or Firm* — Kilpatrick Townsend & Stockton LLP; Dean W. Russell, Esq.

(57) ABSTRACT

Multiple features of seating assemblies are detailed. Innovations in or to tray tables, luggage bars, arm rests, seat backs, and seat frames are included, with features being incorporated into seating assemblies either separately or in any combination. The assemblies are configured principally for passenger aircraft but may be used elsewhere as appropriate or desired.

16 Claims, 15 Drawing Sheets

(56) References Cited

U.S. PATENT DOCUMENTS

| | | | |
|---|---|---|---|
| 5,941,603 A * | 8/1999 | Wein ........................ 297/411.35 |
| 6,047,444 A * | 4/2000 | Braun ............................ 16/324 |
| 6,132,128 A * | 10/2000 | Burrows ........................ 403/96 |
| 6,237,994 B1 | 5/2001 | Bentley et al. |
| 6,328,384 B1 * | 12/2001 | Yamauchi et al. ....... 297/411.29 |
| 6,402,244 B1 | 6/2002 | Schonenberg |
| 6,644,593 B2 | 11/2003 | Lambiaso |
| 6,698,838 B2 * | 3/2004 | Kain ........................ 297/411.32 |
| 6,752,462 B1 * | 6/2004 | Kain et al. ............... 297/411.38 |
| 6,916,068 B2 * | 7/2005 | Kitamura et al. .......... 297/411.3 |
| 7,568,766 B2 * | 8/2009 | Chen et al. ............... 297/411.32 |
| 7,611,205 B2 * | 11/2009 | Chen et al. ............... 297/411.32 |
| 2002/0096928 A1 * | 7/2002 | Bidare ..................... 297/411.32 |
| 2002/0105217 A1 * | 8/2002 | Khedira et al. .......... 297/411.32 |
| 2002/0175554 A1 | 11/2002 | Cheng |
| 2004/0124687 A1 * | 7/2004 | Nae et al. ................. 297/411.32 |
| 2005/0258672 A1 | 11/2005 | Schweizer |
| 2009/0309407 A1 * | 12/2009 | Saito et al. ............... 297/411.32 |
| 2010/0032999 A1 | 2/2010 | Petitpierre |

OTHER PUBLICATIONS

International Preliminary Report on Patentability dated May 2, 2013 in Application No. PCT/IB2011/002491.
International Search Report and Written Opinion dated Jun. 29, 2012 in Application No. PCT/IB2011/002491.
Partial European Search Report dated Jan. 17, 2014 in Application No. EP13170275.

* cited by examiner

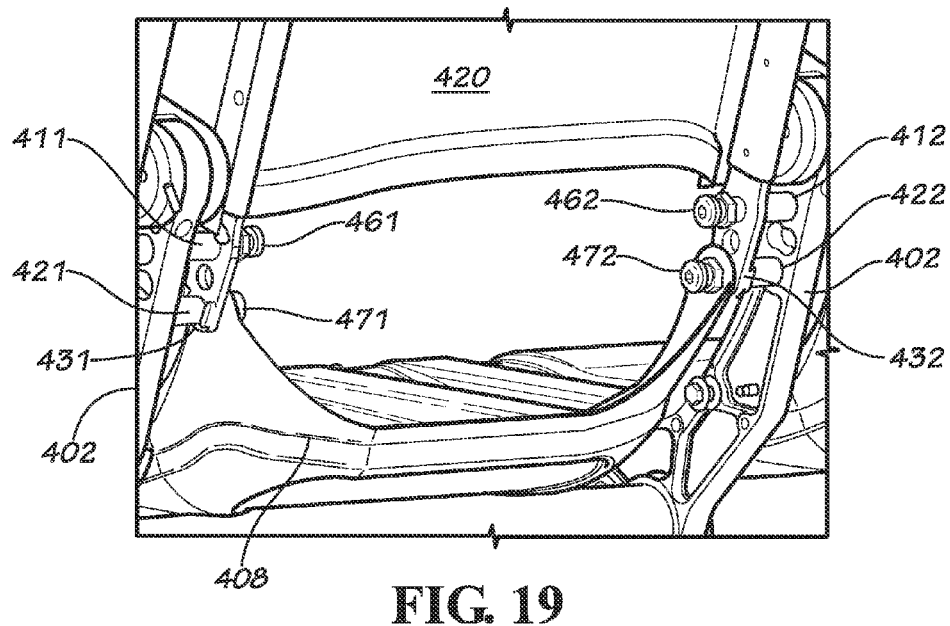
FIG. 19
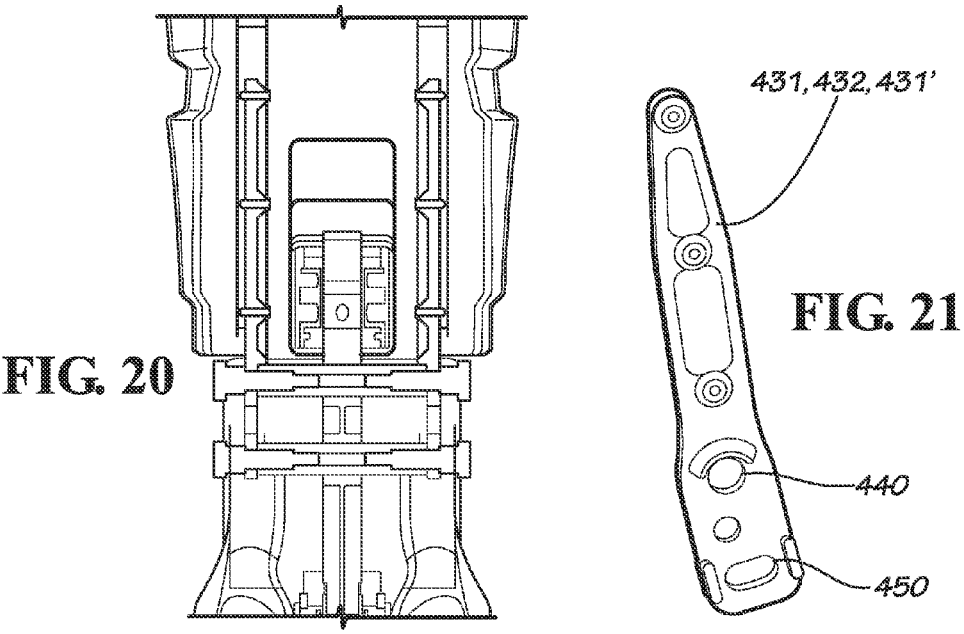
FIG. 20
FIG. 21

PASSENGER SEATING ASSEMBLIES AND ASPECTS THEREOF

FIELD OF THE INVENTIONS

These inventions relate to seating assemblies and more particularly, but not necessarily exclusively, to aspects of seating units configured for use on-board passenger aircraft and other transport vessels.

BACKGROUND OF THE INVENTIONS

Disclosed in U.S. Pat. No. 4,526,421 to Brennan, et al. are existing aircraft seats with various conventional components. Illustrated, for example, in FIG. 7 of the Brennan patent is a typical tray table adapted to deploy from the rear face of the seat in front of the user. Such table may assume either of two positions: (1) a horizontal position parallel to the deck on which the seats are mounted (when the table is in use), with arms connecting the table to a fore seat outside the envelope of the seat back and (2) a vertical position substantially perpendicular to the deck for when the table is stowed. Arm rests either are fixed in position or pivot upward from their nominal positions of FIG. 1 of the patent.

Described in U.S. Pat. No. 6,644,593 to Lambiaso is an alternative aircraft seat in which a tray table is stowed in a cavity within an arm rest. Although a cover of the arm rest may pivot to allow access to the cavity, the position of the remainder of the arm is fixed relative to the seating deck. Similarly, arm rests of U.S. Pat. No. 6,237,994 to Bentley, et al. have covers allowing access to tray tables, but the arm rests themselves do not move independently of the seat frame.

SUMMARY OF THE INVENTIONS

The present inventions provide alternative features to some of those described in the Brennan, Lambiaso, and Bentley patents. For example, tray tables may be fitted into upper portions of fore seat backs with associated arms positioned within the envelopes of the seat backs. The arms further may be inclined so that the rotational axis of a table may be above a horizontal plane in which it is deployed for use. Moreover, the tray tables may function as energy-absorption elements in the event they are contacted by passenger heads or bodies (during aircraft crash, for example).

Other tray tables of the inventions instead may be positioned near or under (but not necessarily within) associated arm rests. Instead, the tables may be attached to portions of seat frames (typically seat spreaders) using, for example, pods or arms. When stowed, the tables may be positioned in spaces between seats, functionally serving to bound (at least in part) a seating area available to an occupant of each seat. Different versions of the tables may be deployed either after lifting associated arm rests or without having to lift the arm rests. No compartment need necessarily be designed for any of these tray tables, and a single pod placed between seats may accommodate two tray tables (one associated with each adjacent seat) if desired.

Seating assemblies of the present inventions may, if desired, include luggage bars. Such bars conventionally function solely to help retain underseat luggage in place; they do not absorb bending stresses to which a front leg of a seating assembly may face. By contrast, those of the present invention are configured to absorb some of these bending stresses, reinforcing the frames of the assemblies and permitting front legs to be simple tubes if desired. In particular, bossheads may be used to connect luggage bars to one or more front legs so that limited (or no) rotation of one to the other may occur, with the connections allowing force transfers from the legs to the bars.

As noted above, arm rests often may be fixed in (horizontal) position or allowed to pivot upward from that position. Some pivoting arm rests additionally include means for locking the rests in horizontal position when appropriate. These rests are not interchangeable at present; in other words, a pivoting arm rest may not readily substitute for a fixed-position arm rest and vice-versa. Arm rests of the present inventions, however, may effect this substitution. They are thus in at least this sense "universal," in that they may be configured in advance to be either fixed or pivotable. Indeed, merely by changing a single locking pin, an arm rest may be pre-configured in any of the above-described manners.

Seat backs of the present inventions likewise may include universal mountings regardless of whether the backs are fixed or, instead, permitted to recline. Using the mountings may facilitate distribution of stresses while providing similar stress relief whether or not the backs recline. In some versions, connecting rods on each side of a seat back may be pressed against sleeves in order to prevent recline.

Finally, seat frames—particularly in areas between adjacent seat bottoms—may accommodate controllers for certain passenger-actuatable features of the seats. Rather than placing these controllers in cavities within arm rests, as is often presently done, controllers among the present inventions may be placed on or in seat frames. Such placement may allow associated cables to be mounted on fixed parts and for more direct routing of the cables. It also permits arm rests to be thinner and lighter if desired.

It thus is an optional, non-exclusive object of the present invention to provide innovative aspects of passenger seating assemblies, any one or more of which may be utilized independently of any other one or more such aspects.

It is another optional, non-exclusive object of the present invention to provide seating assemblies in which tray tables are positioned within seat backs such that their associated arms are within (lateral) envelopes of the backs.

It is a further optional, non-exclusive object of the present invention to provide seating assemblies in which tray tables may be positioned underneath or adjacent arm rests but not necessarily within any cavities associated with the rests.

It is, moreover, an optional, non-exclusive object of the present invention to provide seating assemblies in which luggage bars may be reconfigured to absorb some forces to which seat legs may be subjected.

It is also an optional, non-exclusive object of the present invention to provide seating assemblies in which arm rests may be configured in advance to be either fixed or pivotable relative to their associated seat frames.

It is an additional optional, non-exclusive object of the present invention to provide seating assemblies in which stress-relieving connecting rods may be deployed in connection with seat backs, with such rods functioning regardless of whether the seat backs may recline.

It is yet another optional, non-exclusive object of the present invention to provide seating assemblies in which controllers with which passengers interface are repositioned on or in seat frames rather than, for example, on or in arm rests.

Other objects, features, and advantages of the present invention will be apparent to those skilled in appropriate fields with reference to the remaining text and the drawings of this application.

BRIEF DESCRIPTION OF THE DRAWINGS

FIG. 19 is a view of an articulation mechanism for use with a seat having a non-reclinable seat back.

FIG. 20 is a cross-sectional view of the mechanism of FIG. 19.

FIG. 21 is a view of a connecting rod forming part of the mechanism of FIG. 19.

DETAILED DESCRIPTION

Figure 1:
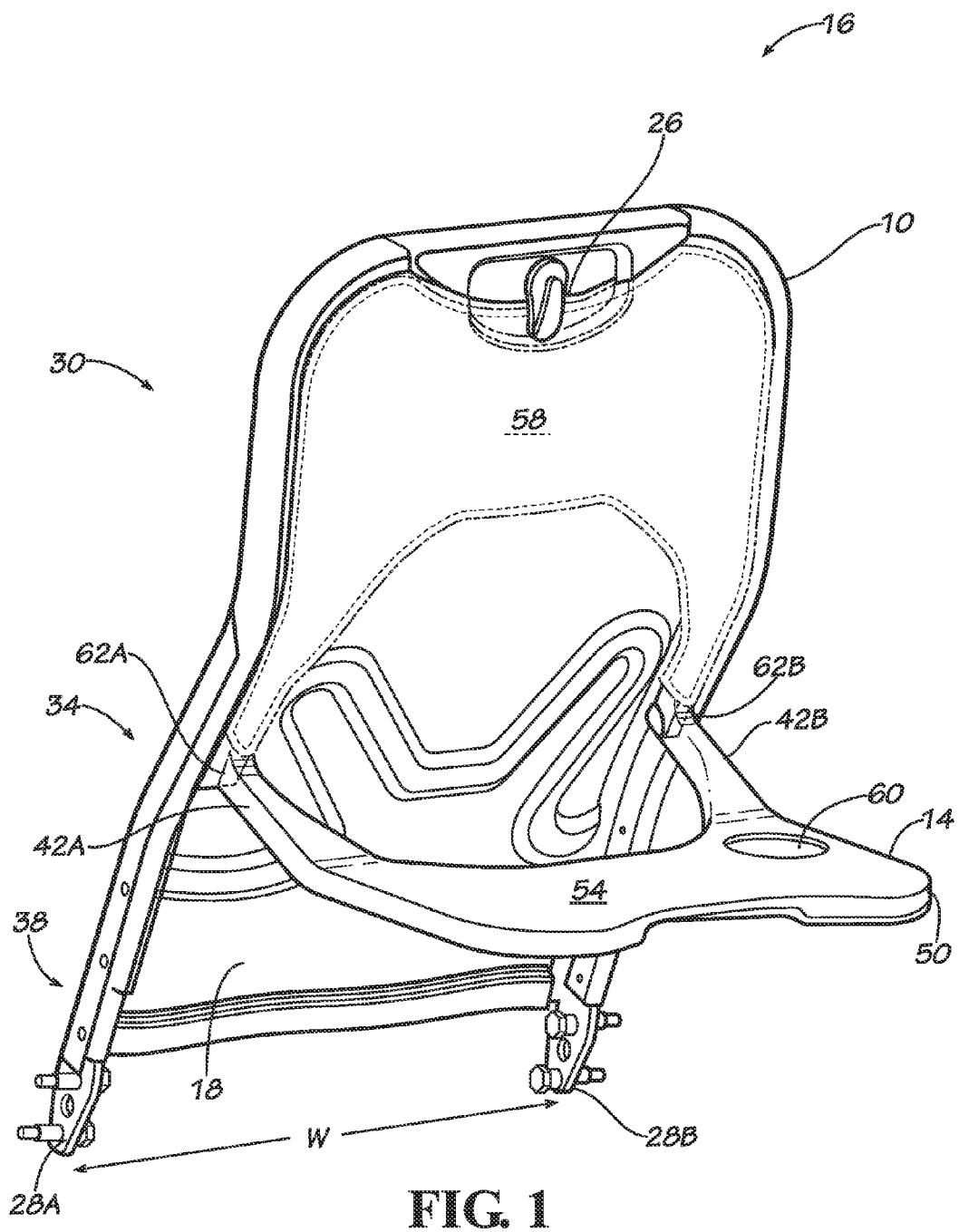
FIG. 1 is a perspective view of an exemplary tray table consistent with the present inventions and configured for use principally with a non-reclinable seat back.
Figure 2:
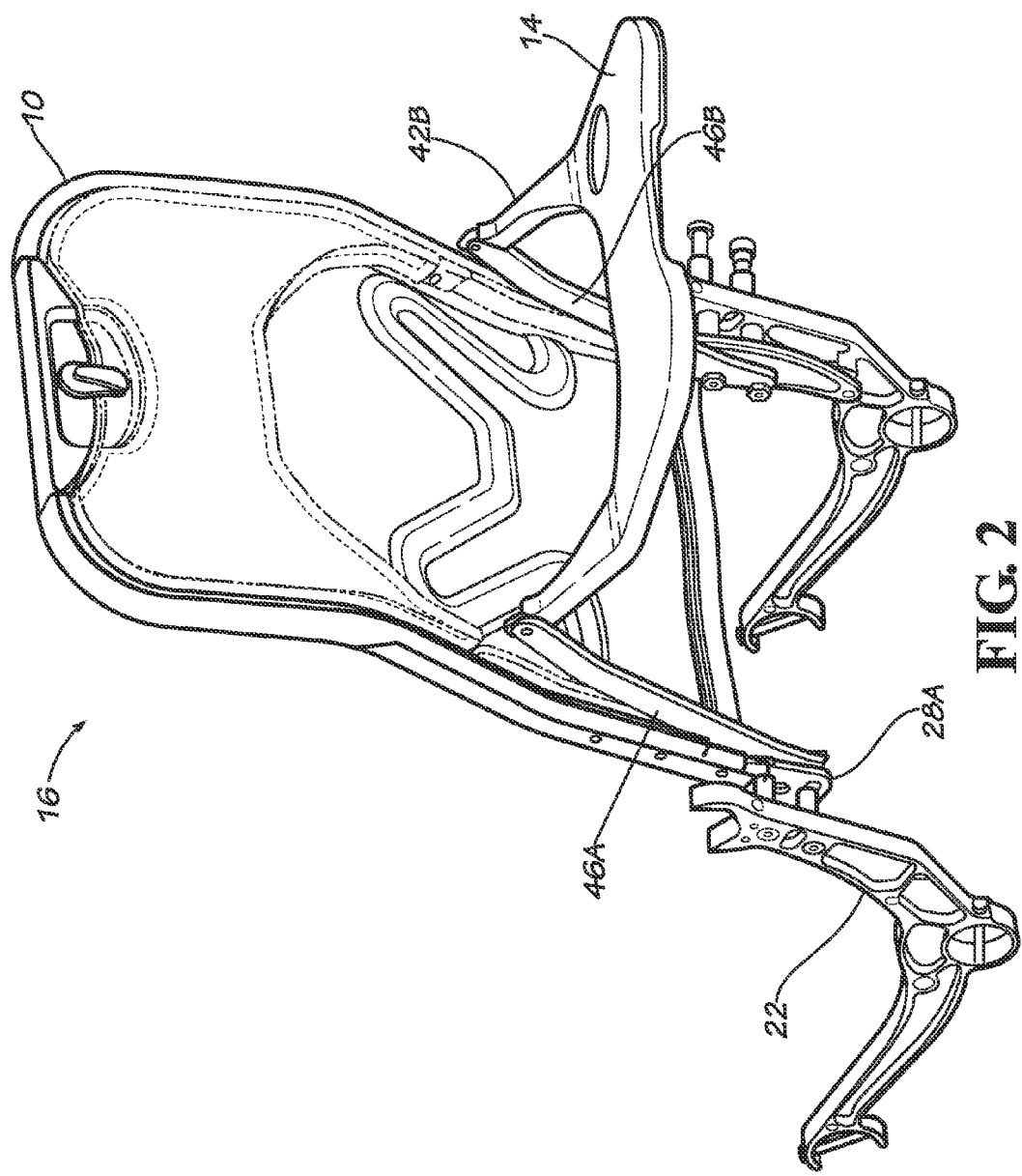
FIG. 2 is a perspective view of a second exemplary tray table consistent with the present inventions and configured for use principally with a reclinable seat back.

Illustrated in FIGS. 1-2 are seat back 10 and tray table 14. Seat back 10 may include a fore face (not shown) and rear face 18 and be connected to seat frame 22 (see FIG. 2) so as to form part of a seating assembly 16 for a passenger. Rear face 18 is configured to accommodate tray table 14 when stowed, including pivoting latch 26 or similar means for retaining tray table 14 in a stowed position. It also defines a general width W between its lower extremities 28A-B. As is well known to those skilled in the art, tray table 14 is adapted for use by a passenger sitting immediately behind seating assembly 16.

Rear face 18 may include any or all of upper portion 30, central portion 34, and lower portion 38. Conventionally, upper portion 30 may include a video monitor, central portion 34 receives a tray table, and lower portion incorporates a literature pocket. Similarly conventionally, the tray table is connected to arms extending upward from seat frame 22 and presenting laterally beyond extremities 28A-B, causing the arms to be spaced a distance greater than width W. In these conventional assemblies, the rotational axis of the table thus likewise extends beyond width W.

By contrast, rear face 18 is designed to receive tray table 14 in its upper portion 30, which as shown in FIGS. 1-2 may be recessed for that purpose. As detailed in FIG. 1, moreover, primary arms 42A-B of tray table 14 may connect directly to seat back 10—especially if the seat back 10 does not recline—and thus define a pivoting or rotational axis no greater than width W. Alternatively, for a reclinable seat back, primary arms 42A-B may connect to secondary arms 46A-B (see FIG. 2) connected to either or both of seat back 10 or seat frame 22, preferably at points on the rotational axis of the seat back 10. Clear from FIG. 2, however, is that secondary arms 46A-B need not extend laterally beyond extremities 28A-B and thus too are spaced a distance less than or equal to width W.

In addition to primary arms 42A-B, tray table 14 may comprise support 50. Support 50 provides a useful portion of tray table 14, including generally planar upper surface 54 and lower surface 58 (shown in dotted lines). Support 50 also may be integral with or attached to primary arms 42A-B and, if desired, may have one or more folds. When tray table 14 is deployed, its upper surface 54 is generally horizontal so as to support a food tray or other objects and, if desired, may include recess 60 for a beverage cup or other container. Detailed in FIGS. 1-2 is that primary arms 42A-B may be inclined upward from support 50 to their connections 62A-B with seat back 10; accordingly, the rotational axis existing between the connections 62A-B is above the plane of upper surface 54 when tray table 14 is deployed. The indented form of the lower part of tray table 14 enables placement of a cup holder (not shown) on seat back 10 if desired, which cup holder can be used whether tray table 14 is deployed or stowed.

By accommodating tray table 14 in upper portion 30, central portion 34 is available for literature stowage and lower portion 38 is unobstructed to provide more knee and leg room for the passenger seated behind seating assembly 16. Lower surface 58 additionally may serve as an ornamental element of seating assembly 16 when tray table 14 is stowed. Alternatively, because of its high visibility to a passenger seated behind seating assembly 16 when tray table 14 is stowed, lower surface 58 may include safety admonitions, advertising, or other information. Finally, in its stowed position in upper portion 30, tray table 14 may function to absorb energy should it be contacted by a passenger's head, for example, in the event of an aircraft crash or rapid deceleration.

FIGS. 3-6 detail alternate tray table assemblies 100 of the present inventions. Rather than being connected to seating assemblies to the fore of the passengers intended to use them, table assemblies 100 may be attached to units which the passengers occupy. Table assemblies 100 thus are especially (although not exclusively) useful at bulkheads or in other circumstances when no fore seat back is readily available in which to position a tray table.

Figure 4:
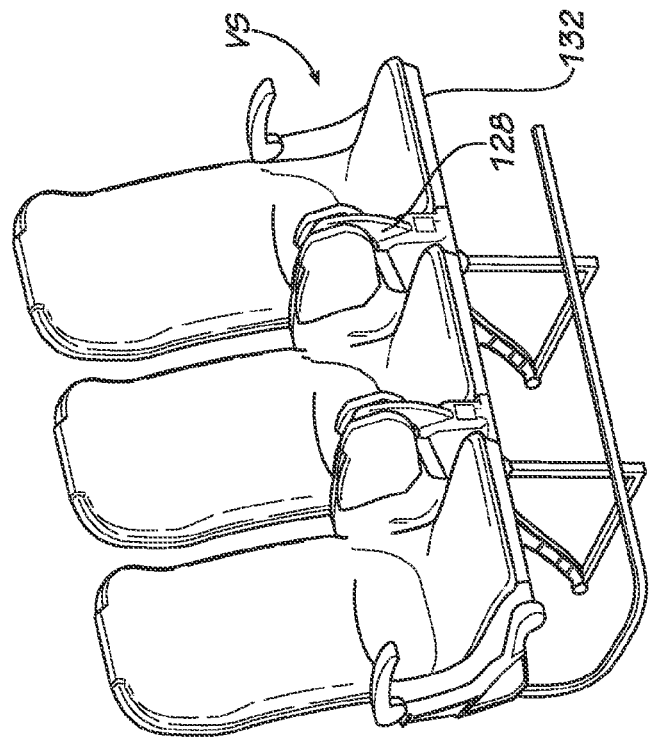
FIG. 4 is a perspective view of the seats and tray tables of FIG. 3, with the tray tables shown as stowed.
Figure 3:
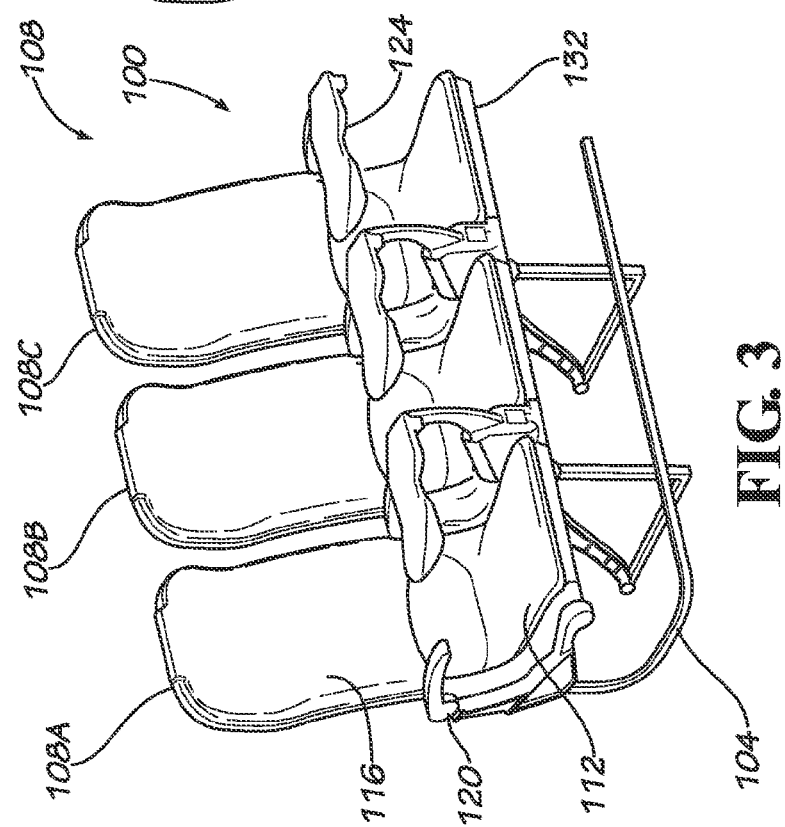
FIG. 3 is a perspective view of a row of seats incorporating other exemplary tray tables consistent with the present invention, with the tray tables shown as deployed.
Figure 7:
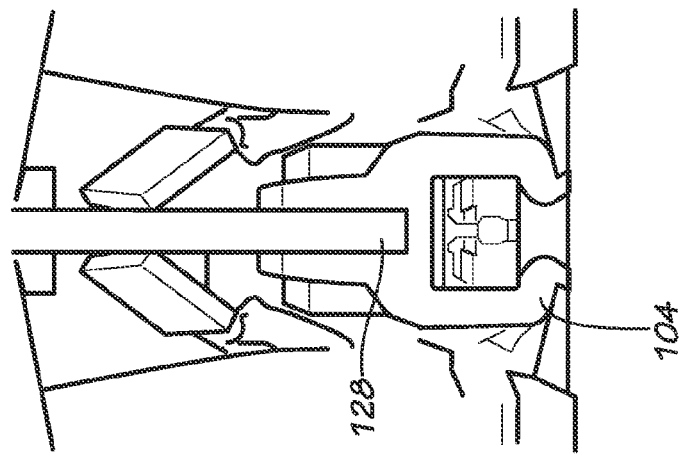
FIG. 7 depicts connection of tray tables of FIGS. 3-4 to a seat frame.

Also illustrated in FIGS. 3-6 is seat frame 104 and adjacent seats 108A-C. Although three seats 108 are shown in FIGS. 3-4, tray table assemblies 100 may function regardless of the number of adjacent seats. Seats 108 may include seat bottoms 112 and seat backs 116, as is conventional, as well as arm rests 120. Seat frame 104, further, may include components referred to as seat spreaders 122.

Arm rests 120 may be connected to frame 104 if desired and be positioned at least between adjacent seats 108. Arm rests 120 also may be designed to pivot between a deployed position (see FIGS. 3-5) and a retracted position (see FIG. 6). Except for reasons discussed in connection with FIG. 6, however, arm rests 120 need not necessarily pivot.

Figure 6:
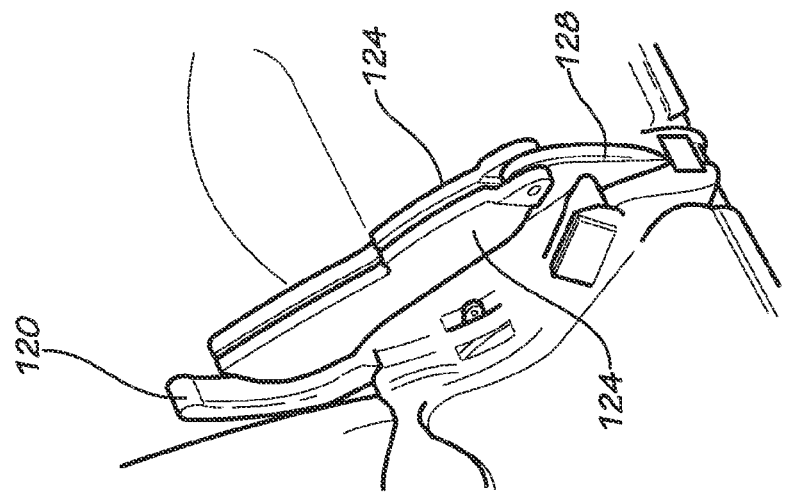
FIG. 6 illustrates a second exemplary stowage positioning of a pair of tray tables of FIGS. 3-4.
Figure 5:
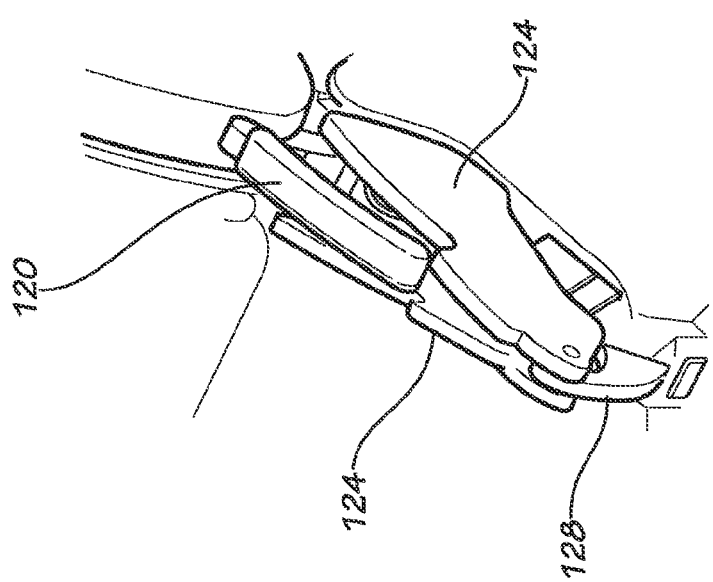
FIG. 5 illustrates a first exemplary stowage positioning of a pair of tray tables of FIGS. 3-4.

As shown, arm rests 120 exist to the sides of seats 108 and are spaced above (i.e. vertically higher than) seat bottoms 112. Vertical space VS thus exists between seat bottoms 112 and arm rests 120, and it is into some or all of this space VS under arm rests 120 that tray table assemblies 100 may be stowed. Illustrated especially in FIGS. 4-6 is that tables 124 of assemblies 100 stow oriented vertically, whereas they deploy in a horizontal orientation (as shown in FIG. 3). Tables 124, further, may be folded when stowed so as to ensure their height is less than VS.

Each tray table assembly 100 also may include support arm 128. Support arm 128 advantageously connects to and extends upward from seat spreader 122 or another part of frame 104. In any event, support arm 128 preferably connects to frame 104 at or adjacent forward edges 132 of seat bottoms 112, unlike arm rests 120, which normally connect to frame 104 toward the rear of frame 104. Support arm 128 additionally may include conventional or other mechanisms allowing tables 124 to pivot between generally vertical and generally horizontal positions.

A support arm 128 may attach to only one table 124 as, for example, shown for seat 108A in FIG. 3 or to two tables 124 as shown for seats 108B-C. It further may position tables 124 slightly laterally of an arm rest 120, as illustrated in FIG. 5, in which case the arm rest 120 need not necessarily pivot upward to deploy tables 124. Alternatively, the assembly 100 of FIG. 6 requires upward pivoting of arm rest 120 for deployment of tables 124.

Assemblies 100 thus may be lightweight alternatives to corresponding conventional tray table assemblies. They may remain visible even when stowed (see, e.g., FIG. 4), not needing any storage compartment or shroud (and thus being of minimum weight). By allowing some support arms 128 to accommodate two tables 124, all arm rests 120 may be relatively simple and standardized, and no table cavity need be designed into any outboard arm rest.

Figure 8:
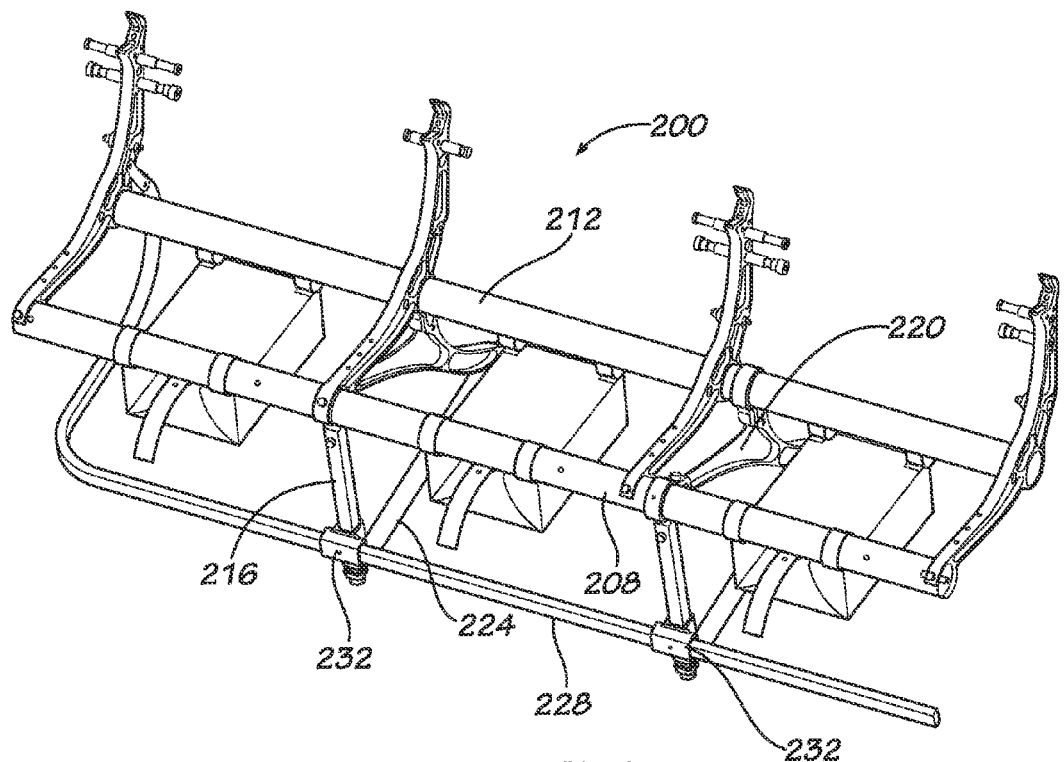
FIG. 8 details a seat frame consistent with the present inventions.
Figure 9:
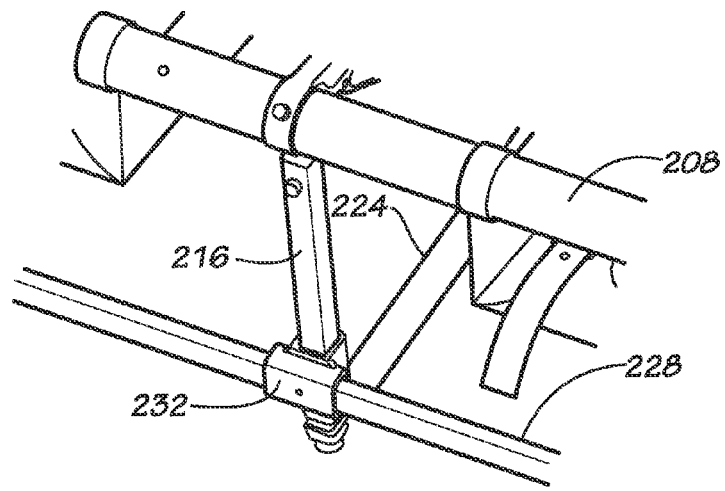
FIG. 9 illustrates a portion of the seat frame of FIG. 8.
Figure 10:
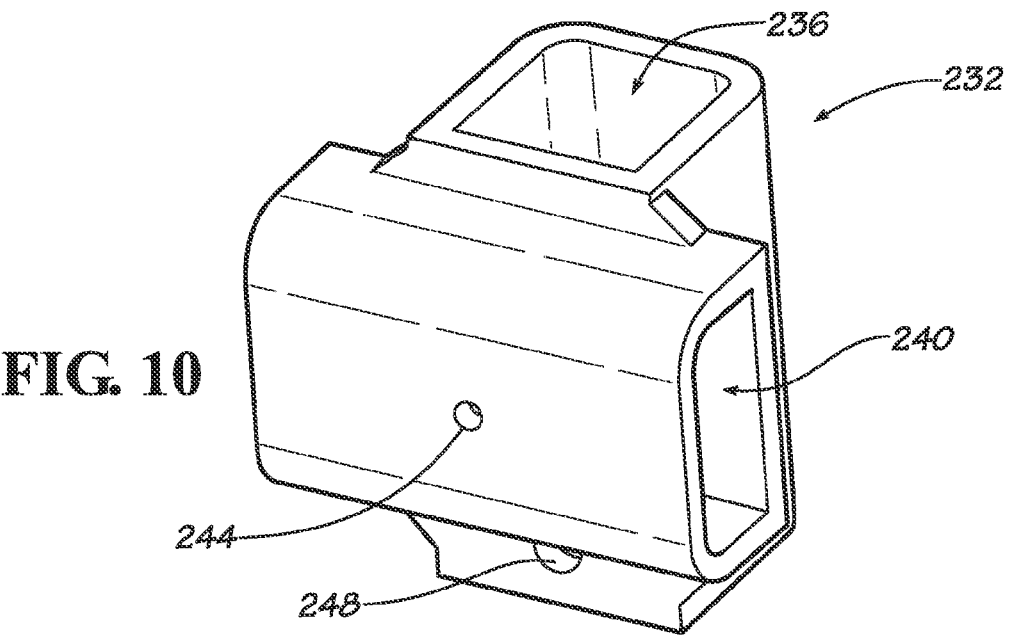
FIG. 10 is a perspective view of a bosshead of the seat frame of FIG. 8.
Figure 11:
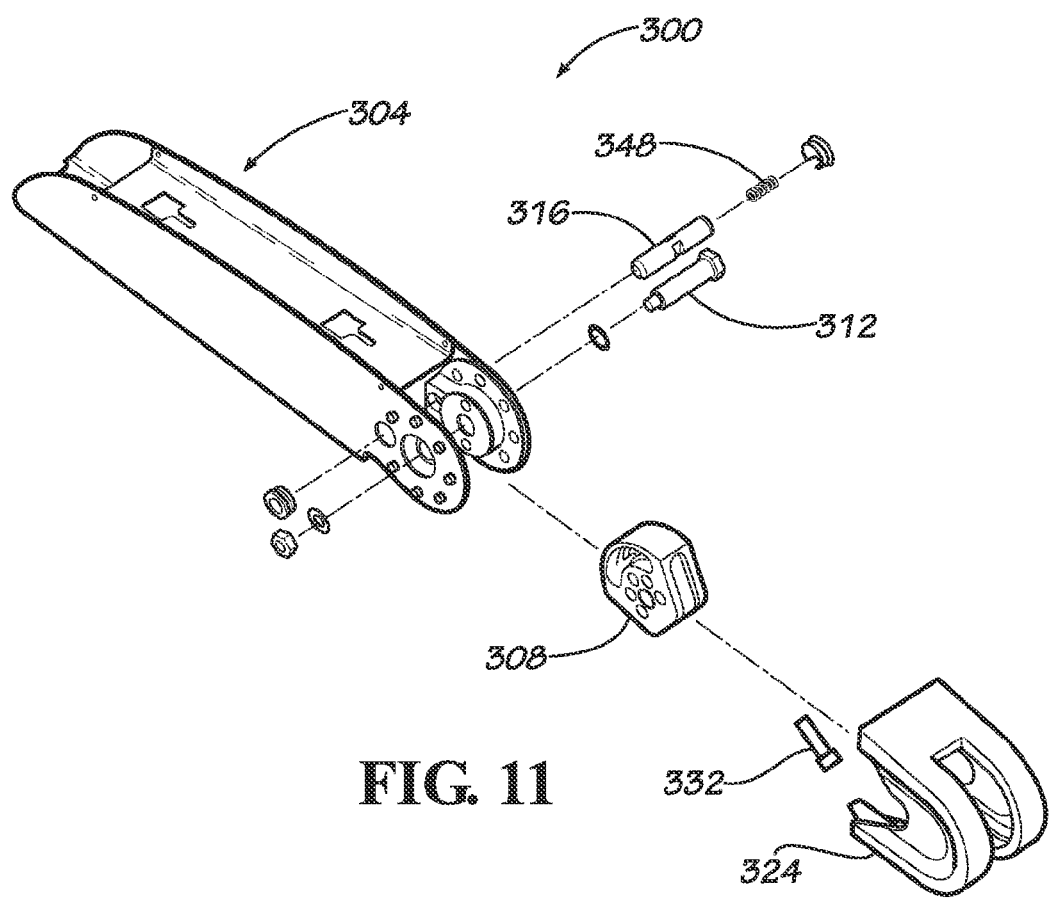
FIG. 11 is an exploded perspective view of an exemplary universal arm rest of the present inventions shown prior to mounting to a seat frame.

FIGS. 8-9 detail aspects of novel seat frame 200. Frame 200 may include fore and aft seat spreaders 208 and 212 and fore and aft legs 216 and 220, respectively. Legs 216 and 220 typically connect to tracks in a floor of an aircraft or other vessel and to each other via horizontal support bar 224. Strength of legs 216 and 220 and their connections to the tracks are important for passenger safety. Indeed, passenger seats connected to frame 200 often must be able to withstand deceleration force of 16 g with only limited track distortion, notwithstanding presumed significant floor distortion associated with the event leading to the extreme deceleration.

Frame 200 also may include luggage bar 228. Conventionally, luggage bar 228 serves only as a stop for objects placed on a vessel floor underneath a seat and is not connected to any legs 216. For purposes of these inventions, however, bar 228 is so connected, hence distributing forces to which legs 216 may be subjected and thus reinforcing frame 200. Indeed, preferably bar 228 is connected to at least two legs 216 (as shown in FIG. 8).

Bosshead 232 provides an exemplary junction for bar 228 and a leg 216. Bosshead 232 may comprise vertical cavity 236 for receiving leg 216 and horizontal cavity 240 for receiving bar 228. For strength, bosshead 232 preferably is a unitary metal structure, although it need not necessarily be either unitary or metallic. Bolts, screws, or other fasteners may be passed through openings 244 and 248 to fix bar 228 and leg 216, respectively, to bosshead 232, thus preventing relative rotation between bar 228 and leg 216. Use of bosshead 232 also may provide sufficient force distribution by bar 228 to permit leg 216 to be a simple tube, unlike the more complex (and heavier) fore legs deployed today.

Detailed in FIGS. 11-17 are features of an exemplary arm rest assembly 300 consistent with the present inventions. Assembly 300 may, if appropriate, include arm rest 304, mounting bosshead 308, bolt 312 or other means permitting pivoting of arm rest 304 relative to bosshead 308, and locking pin 316. Assembly 300 additionally may include finishing cover 320, mounting support 324, and any other suitable element or component.

Conventionally, arm rests within commercial passenger aircraft are of three general types: (1) fixed position arm rests such as those often located on so-called "window" seats abutting the fuselage or cabin wall; (2) pivotable arm rests such as those often located between adjacent seats, with pivoting between horizontal and generally vertical positions allowed freely; and (3) pivotable arm rests such as those located on so-called "aisle" seats, with the arm rests locked into a horizontal position until a latch is sprung. Adjustment mechanisms are typically distributed among arm rests and seat frames so that final adjustment of a fixed, freely pivoting, or locking pivoting arm rest cannot occur until its assembly is mounted on a seat frame.

Figure 12:
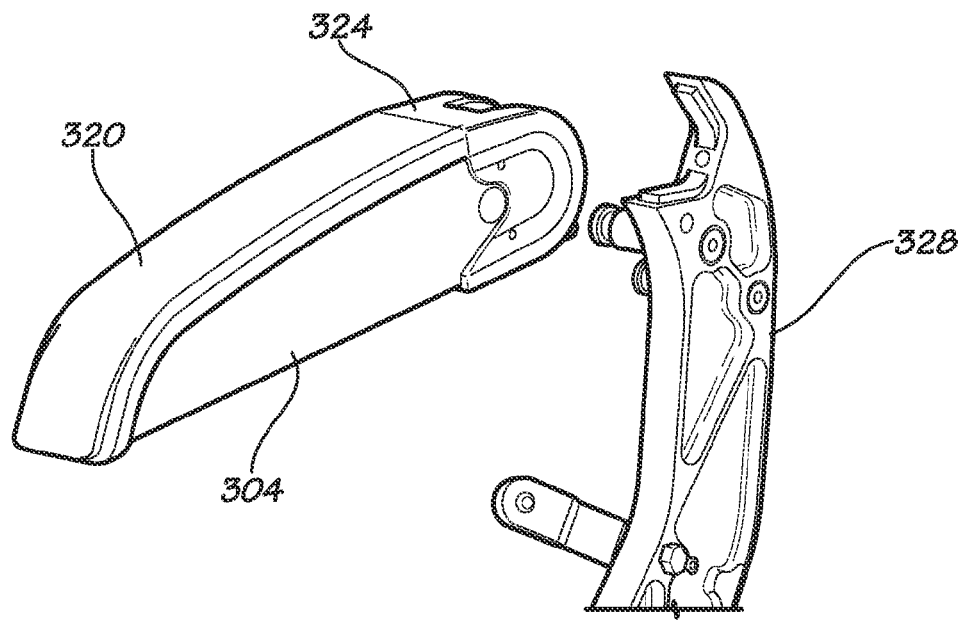
FIG. 12 is a perspective view of the arm rest of FIG. 11 again shown prior to mounting.
Figure 13:
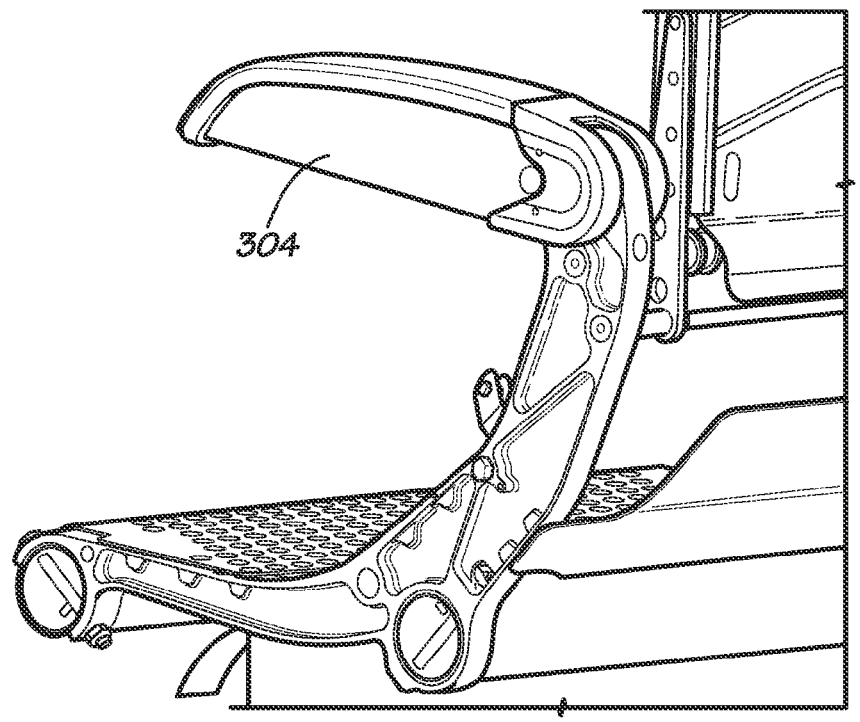
FIG. 13 is a perspective view of the arm rest of FIG. 11 shown mounted to a seat frame.
Figure 14:
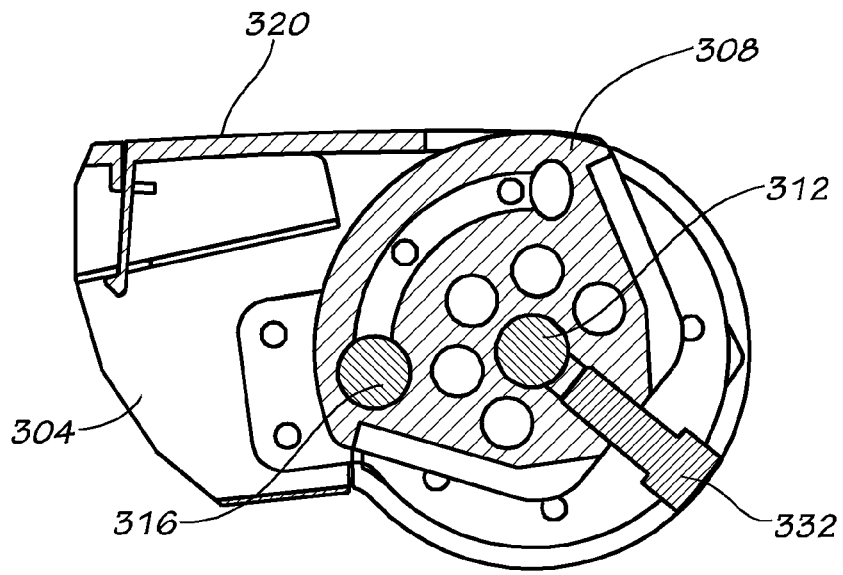
FIG. 14 is a cross-sectional view of a mounting bosshead for use with the arm rest of FIG. 11, the bosshead having a locking pin shown in a first position.
Figure 15:
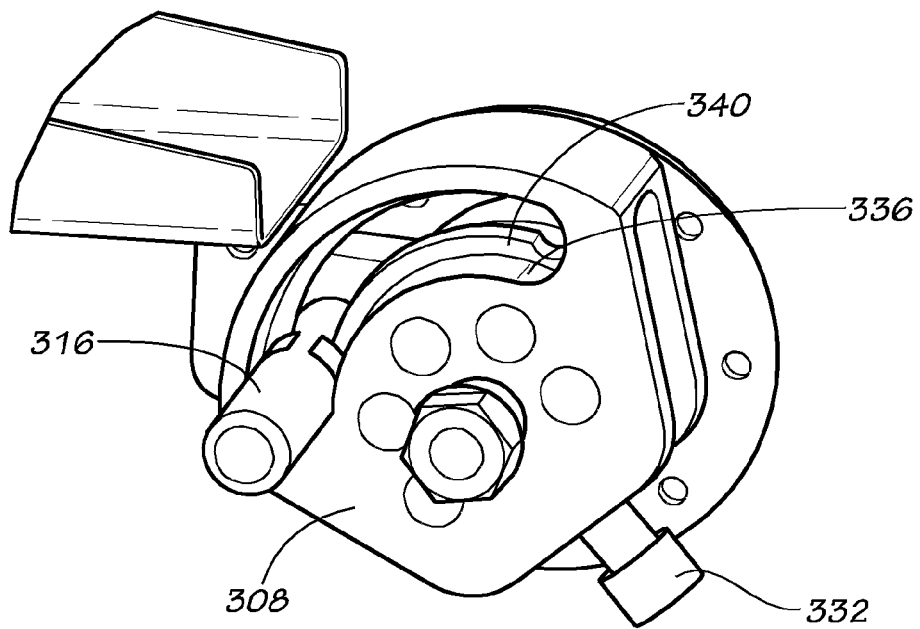
FIG. 15 is a generally elevational view of the mounting bosshead of FIG. 14.

Assembly 300, by contrast, may be assembled prior to its attachment to seat frame 328, as shown in FIG. 12. Bosshead 308, which includes oblong, semicircular slot 336 with boss 340 in its middle and a cylindrical through hole in its lower part, may be connected to arm rest 304 by means of bolt 312 and locking pin 316. Arm rest 304 may pivot only when locking pin 316 can move freely within slot 336.

Assembly 300 thereafter may be attached to seat frame 328 using only screw or other fastener 332. To do so, lugs or protrusions 341 and 342 of frame 328 may be aligned with mortise 343 of bosshead 308 to appropriately position assembly 300 relative to the frame 328. Fastener 332 may then be inserted into frame 328 (typically from the rear), through hole 343, and into bore 335 of bosshead 308 to fix the positioning. Hence, using only fastener 332, assembly 300 may be connected to seat frame 328 without need for any adjustment on a final assembly line.

Figure 16:
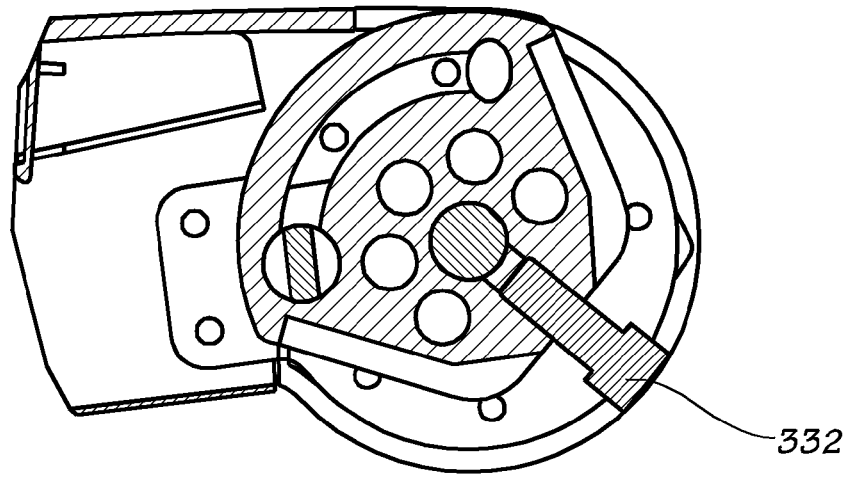
FIG. 16 is a cross-sectional view of the mounting bosshead of FIG. 14 with the locking pin shown in a second position.
Figure 17:
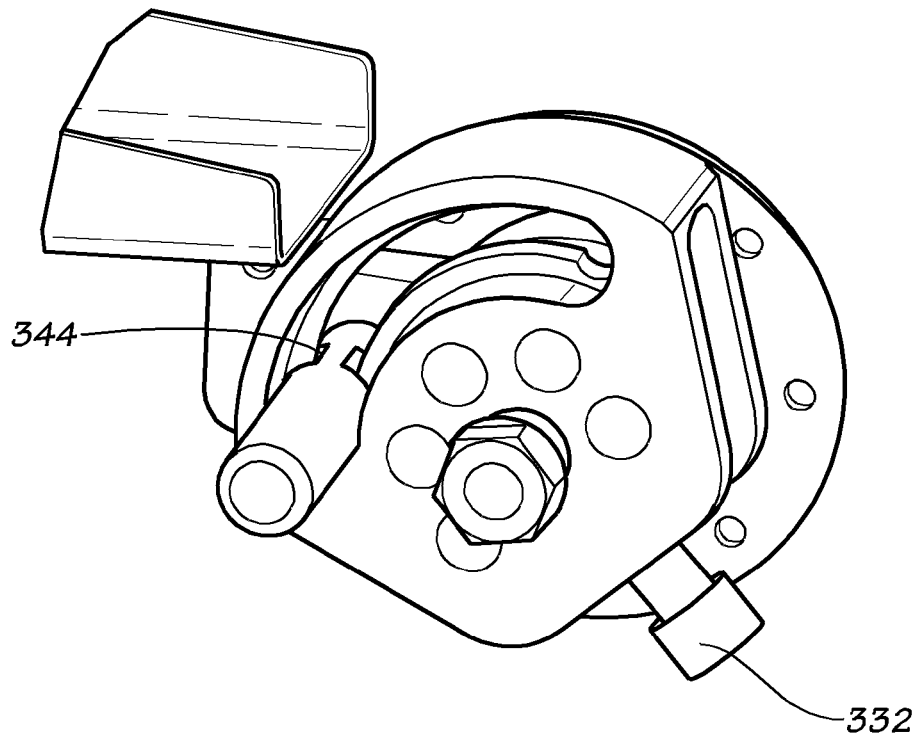
FIG. 17 is a generally elevational view of the mounting bosshead of FIG. 14 with the pin as shown in FIG. 16.

To accommodate the three conventional arm rest types mentioned above, differing locking pins 316 may be used. One such locking pin 316 may have part-circumferential groove 344. If groove 344 is aligned with boss 340 (as shown in FIGS. 16-17), pin 316 may move freely within slot 336 and arm rest 304, in turn, may freely pivot. If groove 344 is misaligned with boss 340 (see FIGS. 14-15), by contrast, arm rest 304 will not pivot until the groove 344 is realigned. Misalignment may occur intentionally by using spring 348 to bear on pin 316, with simple pressure functioning to "unlatch" the misalignment so as to allow arm rest 304 to pivot. Finally, arm rest 304 may be fixed in a horizontal, non-pivoting position merely by utilizing a pin 316 without any groove.

Hence, merely by choosing a pin 316 and deciding whether to initially have spring 348 bearing on the pin 316, any of the three general types of arm rests may be created prior to mounting of assembly 300. This increases the versatility of assembly 300 and allows it to be mounted to and dismounted from frame 328 quickly and easily. Controls or wiring (or both) for such things as in-flight entertainment (IFE), seat back recline, headphones, power supply, etc. may be incorporated into assembly 300 as appropriate or desired.

Figure 18:
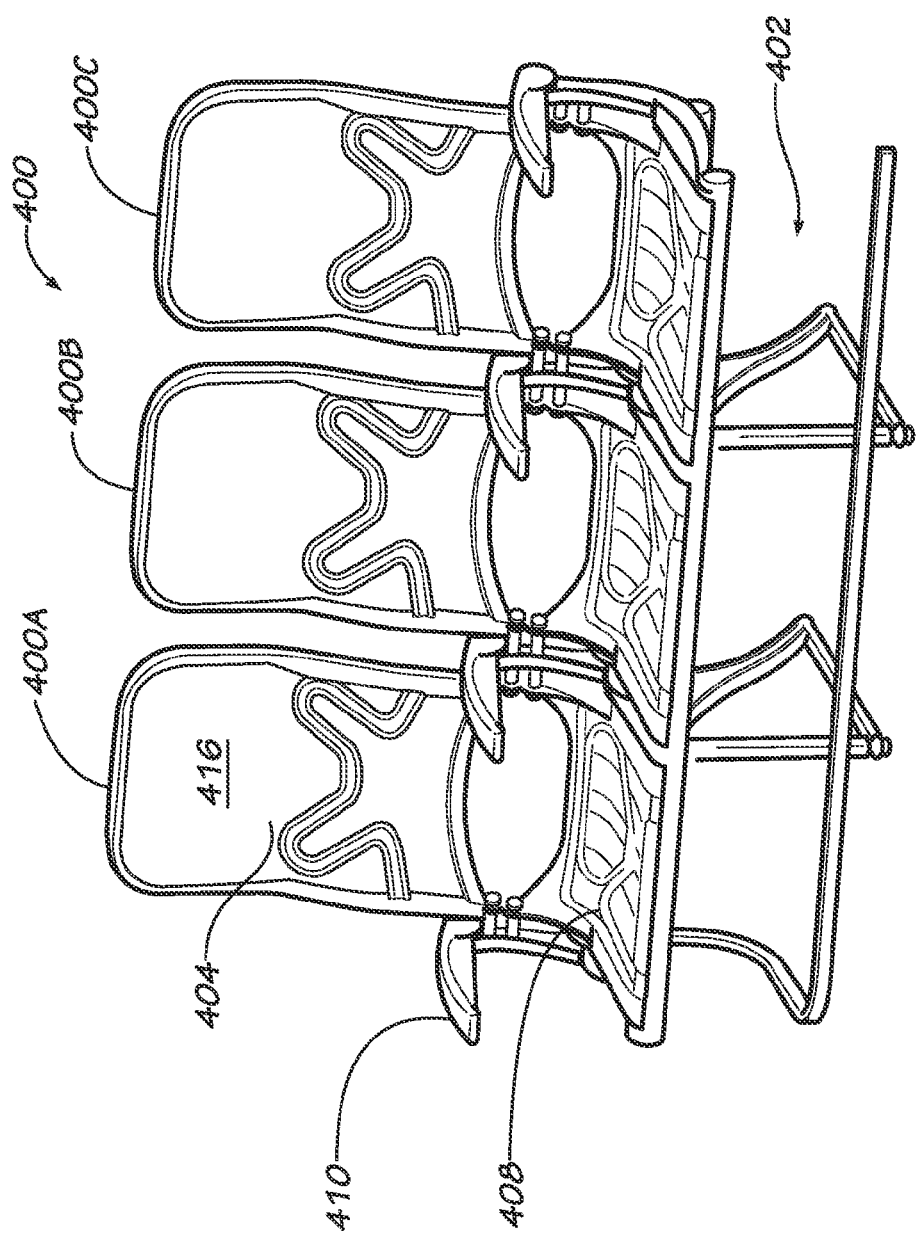
FIG. 18 is a view of another exemplary seating assembly consistent with the present inventions.

FIG. 18 illustrates an exemplary row of seats 400, three of which (denoted seats 400A-C) are shown together with seat frame 402. Each seat 400 may, if desired, include a seat back 404, a seat bottom 408, at least one arm rest 410. Seat back 404, further, may have fore face 416 and rear face 420 (see FIG. 19). Conventionally, a seat back may be mounted so as to pivot relative to the seat frame, with pivoting limited by a locking cylinder. If the seat back is not to pivot, it may be bolted about a second axis off-centered from the pivoting axis.

Articulation mechanism 424 instead may be used to replace these conventional approaches. Mechanism 424 may facilitate distribution of forces onto both sides of a seat back 404, improving response of a seat 400 to stresses. It also may be employed in similar versions regardless of whether seat back 404 is configured to, or not to, recline.

Mechanism 424 may comprise primary transversal articulation sleeves 411 and 412 and secondary transversal articulation sleeves 421 and 422. Each sleeve is aligned with and fixed to frame 402. Also comprising mechanism 424 may be connecting rods 431 and 432, one fixed to each side of seat back 404. Each of rods 431 and 432 may include a transversal hole 440 and a transversal oblong hole 450 of circular arc centered on the axis of hole 440. Main axes 461 and 462 may be in the form of screws mounted in respective primary sleeves 411 and 412, with such screws passing through holes 440 in rods 431 and 432 to function as a pivot axis. Similar screws mounted in secondary sleeves 421 and 422 may function as respective secondary axes 471 and 472, with the screws passing through holes 450 in rods 431 and 432.

If seat back 404 is desired not to recline (e.g. FIG. 19), secondary axes 471 and 472 are configured to press connecting rods 431 and 432 against secondary sleeves 421 and 422. This pressure effects a frictional blockage of movement of seat back 404. By contrast, if seat back 404 is reclinable (e.g. FIG. 22), secondary axes 471 and 472 are configured so as not to press connecting rods 431' and 432' against secondary sleeves 421 and 422. Instead, secondary axes 471 and 472 show frictional clearance with connecting rods 431' and 432' and thus may travel freely within holes 450. To effectuate recline, a hydrolock or other fluid-containing or spring-loaded cylinder 480 may be connected between frame 402 and a connecting rod 432' by means of transversal pivoting axes 491 and 492.

Figure 22:
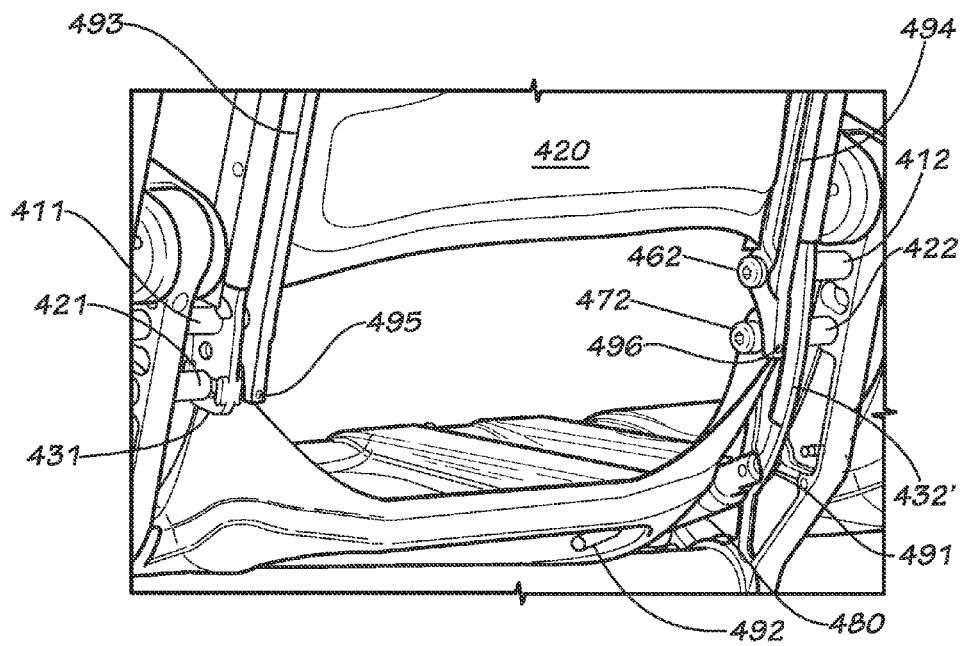
FIG. 22 is a view of an articulation mechanism for use with a seat having a reclinable seat back.
Figure 23:
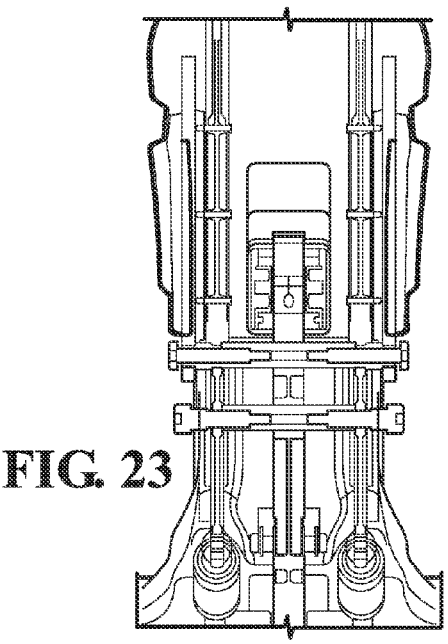
FIG. 23 is a cross-sectional view of the mechanism of FIG. 22.
Figure 24:
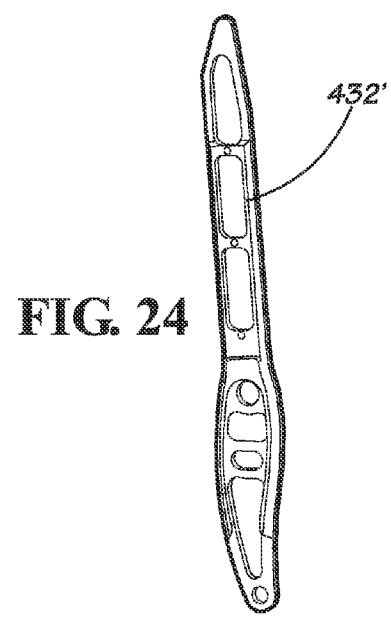
FIG. 24 is a view of a connecting rod forming part of the mechanism of FIG. 22.

Illustrated as well in FIG. 22 are arms 493 and 494, which may be used to connect a tray table to rear face 420 within the envelope of seat back 404. Arms 493 and 494 may mount so as to pivot about main axes 461 and 462, respectively, abutting stops 495 and 496 when fully deployed. Finally, seat bottom 408 may, if desired, connect to seat frame 402 by means of main axes 461 and 462, secondary axes 471 and 472, or both sets of axes.

Figure 25:
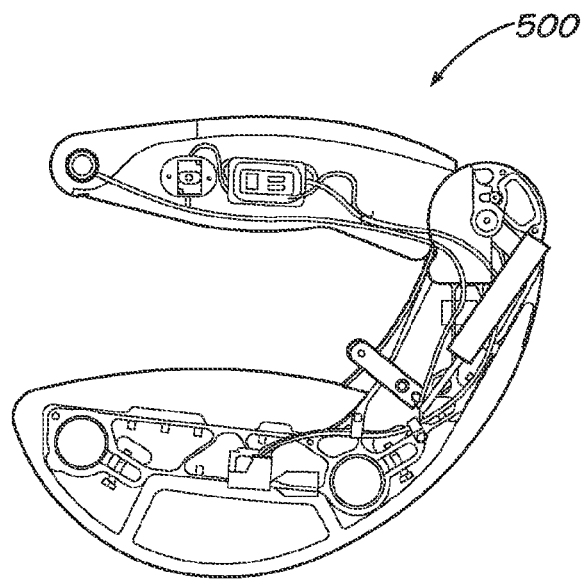
FIG. 25 is a cross-sectional view of a conventional arm rest.

Shown in FIG. 25 is a conventional arm rest 500. It is within such an arm rest 500 that many passenger command actuators currently are placed. Indeed, actuators for seat back recline, jacks for head phones, IFE controls, etc., all typically are incorporated into arm rest 500, which often is moveable. Arm rest 500 thus is complex in many respects, having multiple functions in addition to supporting a passenger's arm.

Figure 26:
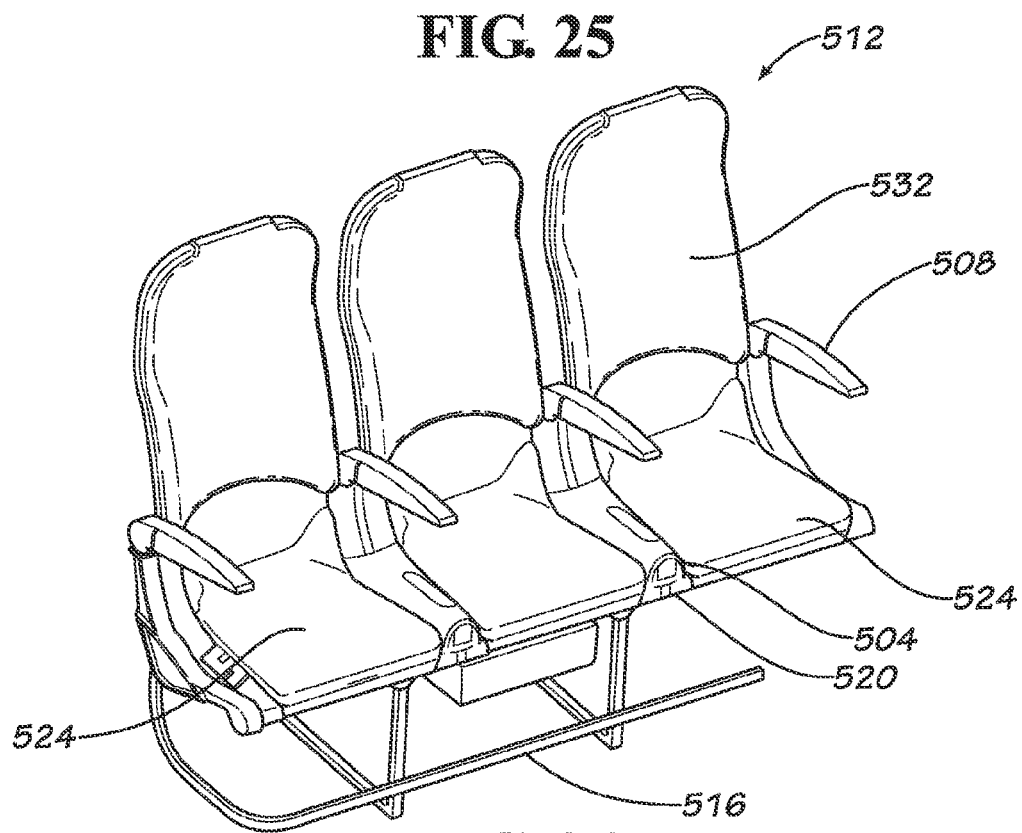
FIG. 26 is a perspective view of an exemplary seat row incorporating a command integration system consistent with the present inventions.
Figure 27:
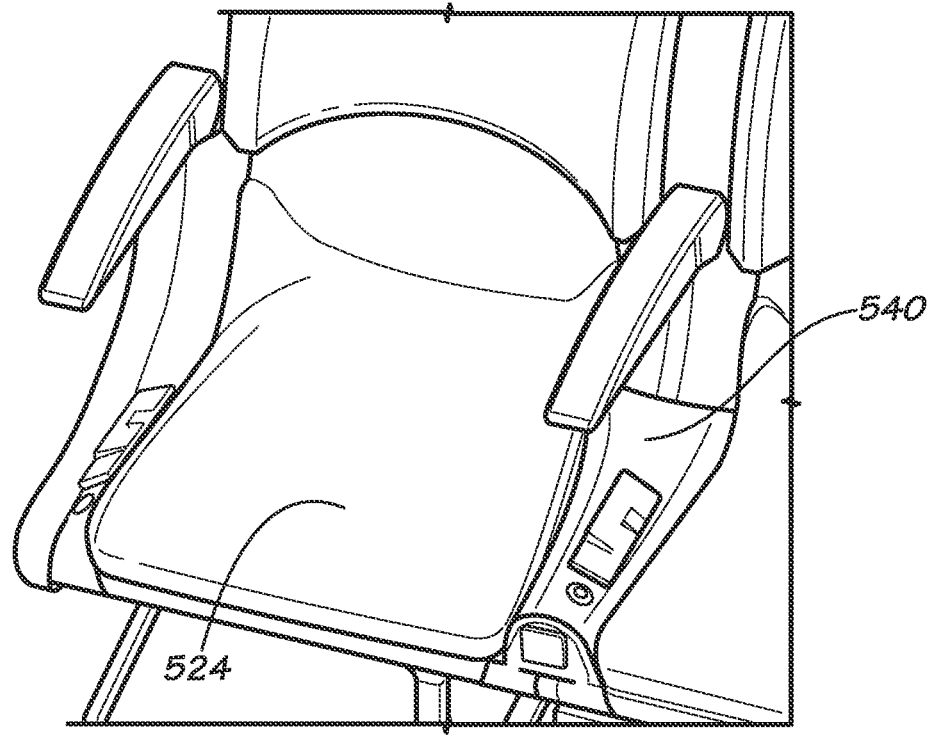
FIG. 27 is a close-up view of part of the seat row of FIG. 26.

Command system 504 of the present inventions transfers location of some or all of these command actuators away from the arm rest of a seat. Hence arm rest 508 of seat 512 need not be complex (unless complexity is desired), and associated cables need not be routed to a moving part. As depicted especially in FIGS. 26-27, command system 504 may be mounted directly or indirectly on seat frame 516. Preferably (although not necessarily), such mounting is to, or near, fore seat spreader 520 so as to place the passenger interface within easy reach of the passenger. It additionally may be positioned adjacent seat bottoms 524. Any suitable means may be used to effect mounting of command system 504 to frame 516. The mounting means may include cover 540 if desired to mask some of system 504 or render it inaccessible to passengers. If present, cover 540 advantageously is removable for maintenance, however.

Figure 28:
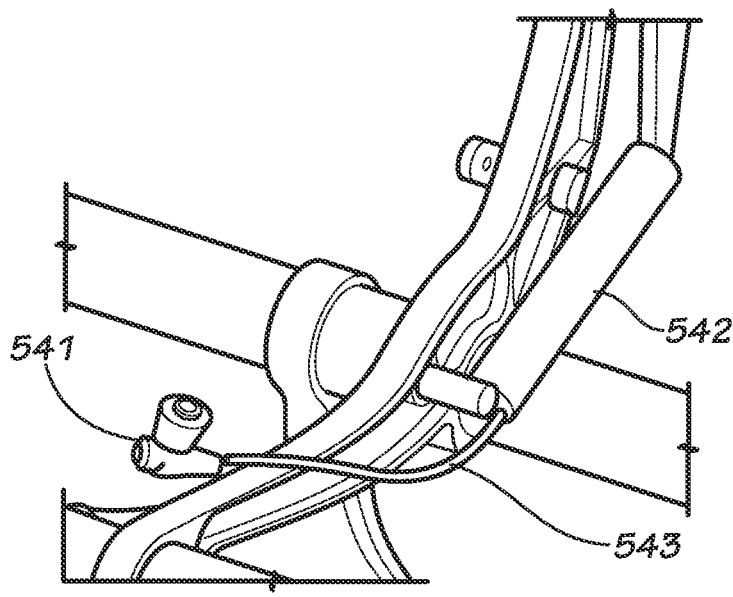
FIG. 28 illustrates a seat recline actuator that may be used as part of the command integration system of FIG. 26.
Figure 29:
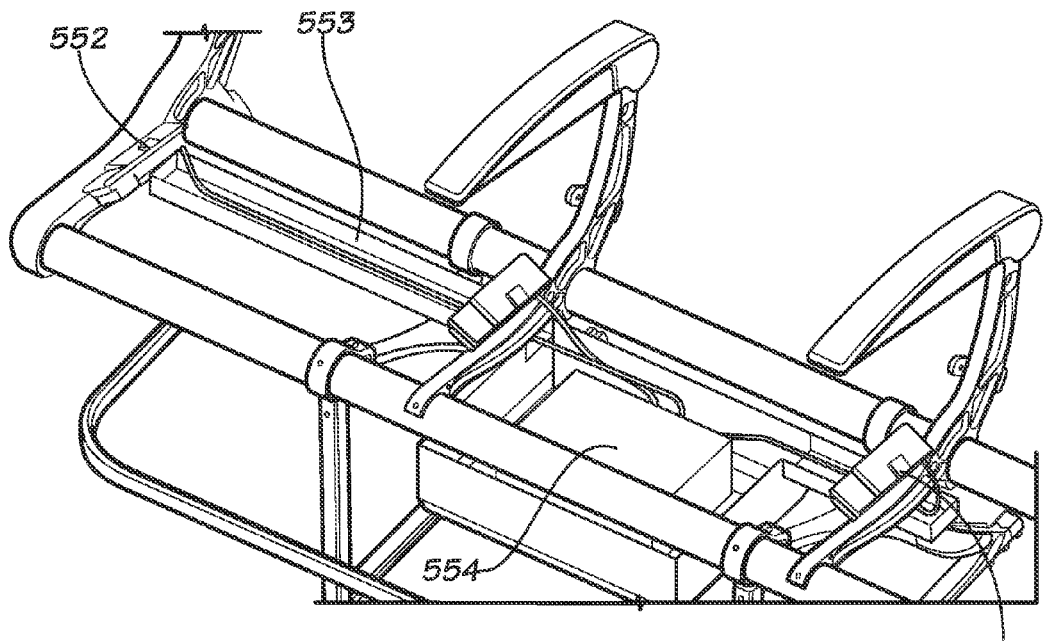
FIG. 29 illustrates aspects of the command integration system of FIG. 26 relating to, at least, audio transmissions.
Figure 30:
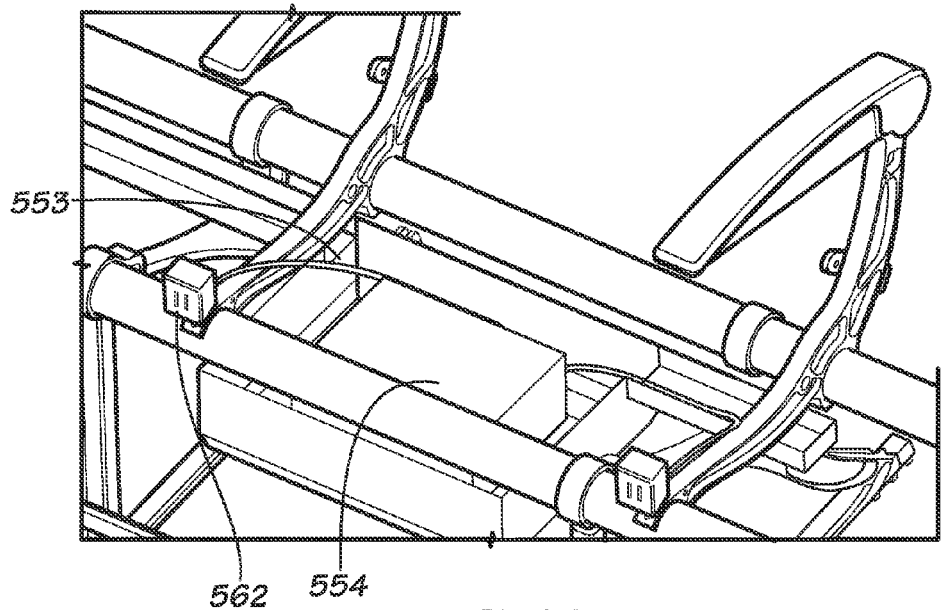
FIG. 30 illustrates electronics that may form part of the command integration system of FIG. 26.

Command system 504 may comprise recline system 528 (FIG. 28) for seat back 532. Recline system 528 itself may comprise lever or button 541, actuating cylinder 542, and a mechanical connecting rod or cable 543. Electrical cables 553 may connect head phone jack 552 and IFE or other actuators 551 to electronics 554, any or all of which additionally may form part of command system 504. Also connected to electronics 554 via electrical cables 553 may be power supply sockets 562, which also may form part of command system 504.

The foregoing is provided for purposes of illustrating, explaining, and describing embodiments of the present invention. Modifications and adaptations to these embodiments will be apparent to those skilled in the art and may be made without departing from the scope or spirit of the invention. Contents of the Brennan, Lambiaso, and Bentley patents are incorporated herein in their entireties by this reference. Also incorporated in their entireties herein by this reference are the contents of the following patent applications: EP10306130 (filed Oct. 18, 2010), EP10306131 (filed Oct. 18, 2010), EP10306133 (filed Oct. 18, 2010), EP10191891 (filed Nov. 19, 2010), and EP10192084 (filed Nov. 22, 2010).

What is claimed is:

1. An arm rest assembly comprising:
   a. an arm rest;
   b. a mounting bosshead (i) defining a curved slot and (ii) comprising a curved boss; and
   c. a pin (i) received by the curved slot and (ii) defining a reduced-width section, the pin configured for receipt by the curved slot in a selected first or second position, the first position having the curved boss aligned with the reduced-width section so as to permit travel of the pin within the curved slot and pivoting of the arm rest relative to the mounting bosshead and the second position having the curved boss misaligned with the reduced-width section so as to prevent pivoting of the arm rest relative to the mounting bosshead.

2. An arm rest assembly according to claim 1 in which the reduced-width section is a groove and the curved slot is semi-circular.

3. An arm rest assembly according to claim 2 further comprising means for aligning the curved boss and the groove.

4. An arm rest according to claim 2 in which the groove is part-circumferential.

5. An arm rest according to claim 1 further comprising a spring configured to bear on the pin.

6. An arm rest assembly according to claim 1 further comprising means for attachment to a seat frame following assembly.

7. An arm rest assembly according to claim 1 further comprising a mounting support connected to the mounting bosshead.

8. An arm rest assembly according to claim 1 further comprising a finishing cover positioned atop the arm rest.

9. An arm rest assembly according to claim 1 in which the mounting bosshead is positioned at least partially within the arm rest.

10. An arm rest assembly according to claim 1 in which the pin is received by the curved slot in the first position.

11. An arm rest assembly configured for assemblage prior to attachment to a seat frame, comprising:
   a. an arm rest;
   b. a mourning bosshead (i) defining a curved slot and (ii) comprising a curved boss; and
   c. a pin (i) selected from the group consisting of pins having uniform diameters and pins having a reduced-width section, (ii) received by the curved slot, and (iii) permitting pivoting of the arm rest relative to the mounting bosshead only when the pin is selected from the group consisting of pins having a reduced-width section and the curved boss is aligned with the reduced-width section of the pin so as to permit travel of the pin within the curved slot; and
   d. means for attachment to a seat frame.

12. An arm rest assembly according to claim 11 in which the reduced-width section of the pin is a groove.

13. An arm rest assembly according to claim 12 in which the groove is part-circumferential.

14. An aircraft passenger seat comprising:
   a. a seat frame;
   b. a pre-assembled arm rest assembly comprising
      i. an arm rest;
      ii a mounting bosshead (A) defining a curved slot and (B) comprising a curved boss; and
      iii. a pin (A) selected from the group consisting of pins having uniform diameters and pins having a reduced-width section, (B) received by the curved slot; and (C) permitting pivoting of the arm rest relative to the mounting bosshead only when the pin is selected from the group consisting of pins having a reduced-width section and the curved boss is aligned with the reduced-width section of the pin so as to permit travel of the pin within the curved slot; and
   c. means for attaching the pre-assembled arm rest to the seat frame.

15. An aircraft passenger seat according to claim 14 in which the reduced-width section of the pin is a groove.

16. An aircraft passenger seat according to claim 15 in which the groove is part-circumferential.

* * * * *